United States Patent
Diaz De Arcaya et al.

(10) Patent No.: US 11,379,504 B2
(45) Date of Patent: Jul. 5, 2022

(54) INDEXING AND MINING CONTENT OF MULTIPLE DATA SOURCES

(71) Applicant: INTERNATIONAL BUSINESS MACHINES CORPORATION, Armonk, NY (US)

(72) Inventors: Josu Diaz De Arcaya, Manchester (GB); Patrick Byrne, London (GB); Richard A. Welp, Manchester (GB); James Wormwell, Manchester (GB)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 404 days.

(21) Appl. No.: 15/435,800

(22) Filed: Feb. 17, 2017

(65) Prior Publication Data
US 2018/0239771 A1    Aug. 23, 2018

(51) Int. Cl.
*G06F 16/00* (2019.01)
*G06F 16/332* (2019.01)
*G06F 16/35* (2019.01)
*G06F 16/31* (2019.01)
*G06F 16/33* (2019.01)

(52) U.S. Cl.
CPC ........ *G06F 16/3322* (2019.01); *G06F 16/316* (2019.01); *G06F 16/3334* (2019.01); *G06F 16/3344* (2019.01); *G06F 16/35* (2019.01)

(58) Field of Classification Search
CPC ........... G06F 17/3064; G06F 17/30619; G06F 17/30663; G06F 17/30684; G06F 17/30705; G06F 16/3322; G06F 16/316; G06F 16/3334; G06F 16/35; G06F 16/3344

USPC ......................................................... 707/728
See application file for complete search history.

(56) References Cited

U.S. PATENT DOCUMENTS

| 7,020,654 | B1 |   | 3/2006 | Najmi |
| 8,140,556 | B2 |   | 3/2012 | Rao et al. |
| 8,166,026 | B1 | * | 4/2012 | Sadler ................... G06F 16/951 |
|           |    |   |        | 707/732 |
| 8,539,001 | B1 |   | 9/2013 | Hairn et al. |

(Continued)

OTHER PUBLICATIONS

List of IBM Patents or Patent Applications Treated as Related dated Feb. 20, 2017 (2 pages).

(Continued)

*Primary Examiner* — Alexandria Y Bromell
(74) *Attorney, Agent, or Firm* — Griffiths & Seaton PLLC

(57) ABSTRACT

A system and method are provided for indexing and mining content of multiple data sources. The method includes: providing a database of learned content of multiple data sources learned using text analysis, the learned content identifying one or more concepts to which a data source relates, wherein the concepts are cognitively associated with the data source and include concepts not explicitly referenced in the data source and providing an index of the learned content including associations between concepts with mappings between concepts and the multiple data sources. The method further includes receiving input of a query and using text analysis to analyze the query to determine one or more query concepts to which it relates and mining the indexed concepts in response to the query concepts to return a list of referenced data sources.

13 Claims, 10 Drawing Sheets

(56) References Cited

U.S. PATENT DOCUMENTS

| | | | |
|---|---|---|---|
| 8,868,540 B2* | 10/2014 | Ture | G06F 21/6227 707/709 |
| 8,938,459 B2 | 1/2015 | Garbe | |
| 9,183,290 B2* | 11/2015 | Griffith | G06F 16/288 707/707 |
| 9,189,479 B2 | 11/2015 | Spivack et al. | |
| 10,417,667 B1* | 9/2019 | Agostino | G06Q 30/0269 |
| 2002/0078134 A1 | 6/2002 | Stone et al. | |
| 2006/0053098 A1* | 3/2006 | Gardner | G06F 16/367 |
| 2007/0156669 A1 | 7/2007 | Marchisio et al. | |
| 2007/0208751 A1 | 9/2007 | Cowan et al. | |
| 2009/0083293 A1 | 3/2009 | Albrecht et al. | |
| 2009/0106307 A1 | 4/2009 | Spivack | |
| 2009/0157491 A1 | 6/2009 | Brougher et al. | |
| 2010/0070496 A1* | 3/2010 | Ghosh | G06F 16/00 707/736 |
| 2010/0070517 A1* | 3/2010 | Ghosh | G06F 16/367 707/758 |
| 2010/0306249 A1* | 12/2010 | Hill | G06Q 50/01 707/769 |
| 2011/0153539 A1 | 6/2011 | Rojahn | |
| 2011/0271232 A1* | 11/2011 | Crochet | G06F 40/194 715/810 |
| 2012/0278316 A1* | 11/2012 | Reznik | G06F 16/24578 707/723 |
| 2013/0159277 A1 | 6/2013 | Liu et al. | |
| 2013/0159298 A1* | 6/2013 | Mason | G06F 16/9535 707/E17.014 |
| 2013/0260035 A1 | 10/2013 | Ban et al. | |
| 2013/0260358 A1* | 10/2013 | Lorge | G06F 40/30 434/362 |
| 2013/0298038 A1 | 11/2013 | Spivack et al. | |
| 2014/0075004 A1* | 3/2014 | Van Dusen | G06F 16/90335 709/223 |
| 2014/0201126 A1* | 7/2014 | Zadeh | A61B 5/165 706/52 |
| 2014/0330837 A1 | 11/2014 | Liu et al. | |
| 2014/0337306 A1* | 11/2014 | Gramatica | G06F 16/2471 707/706 |
| 2015/0172299 A1 | 6/2015 | Khesin et al. | |
| 2015/0310104 A1 | 10/2015 | Marchisio et al. | |
| 2016/0012122 A1* | 1/2016 | Franceschini | G06N 5/025 707/739 |
| 2016/0103875 A1 | 4/2016 | Zupancic | |
| 2016/0188702 A1* | 6/2016 | Lee-Goldman | G06F 16/3322 707/749 |
| 2016/0224542 A1* | 8/2016 | Bulgakov | G06F 16/367 |
| 2018/0217980 A1* | 8/2018 | Baron-Palucka | G06F 40/284 |
| 2018/0239771 A1* | 8/2018 | Diaz De Arcaya | G06F 16/3344 707/707 |
| 2018/0293313 A1* | 10/2018 | Hauptmann | G06F 16/78 |

OTHER PUBLICATIONS

Unknown, "The Secrets to Getting Your Blog Indexed on Google," thebloggingbuddha.com, Feb. 12, 2016 (10 pages).

Unknown, "How to Get Google to Index Your New Website & Blog Quickly," blog.kissmetrics.net, 2016 (19 pages).

Ammar Ali, "How to Get Index Your New Blog Post Super Fast," allbloggingtips.com, Apr. 25, 2016 (41 pages).

* cited by examiner

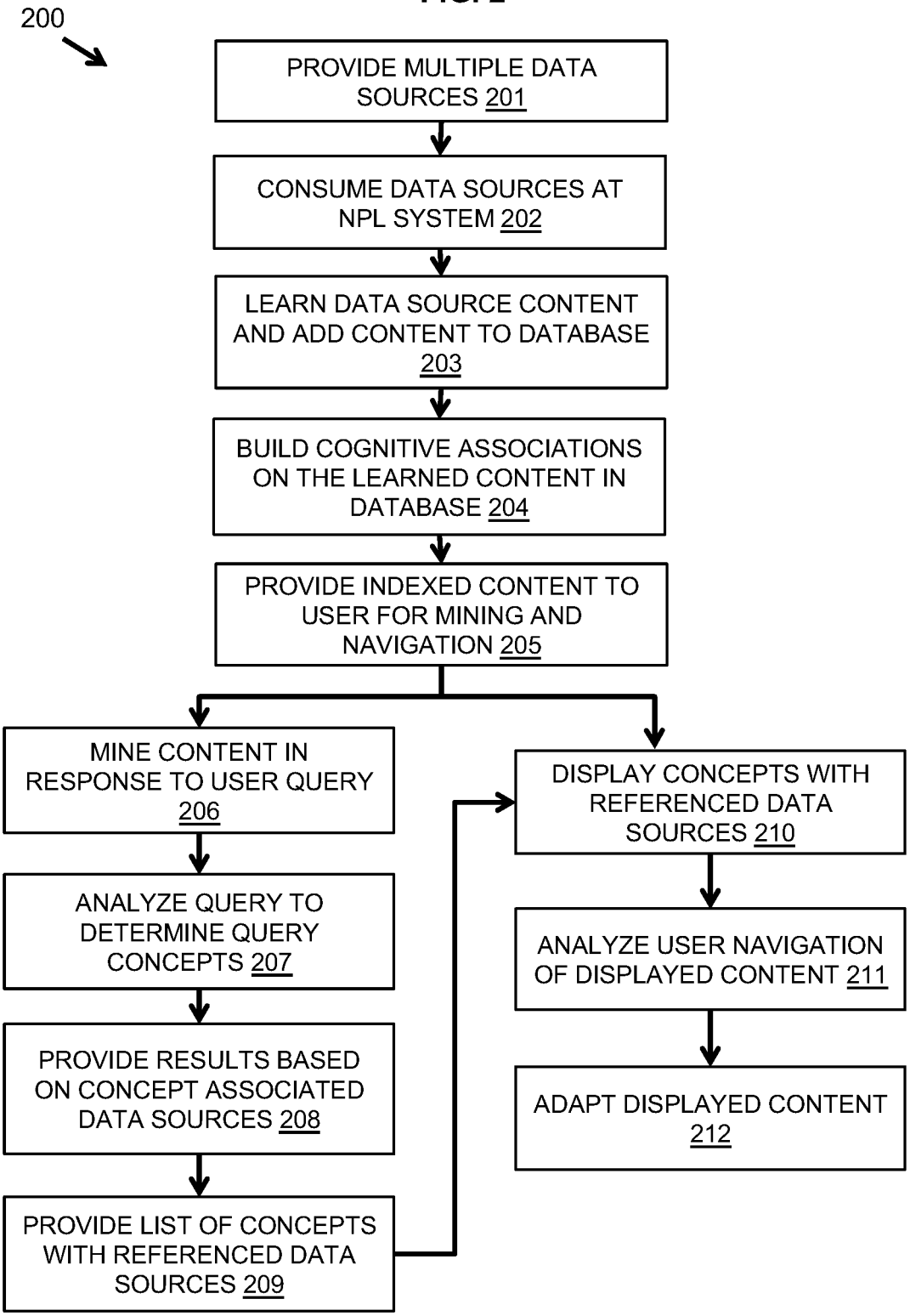

FIG. 4A
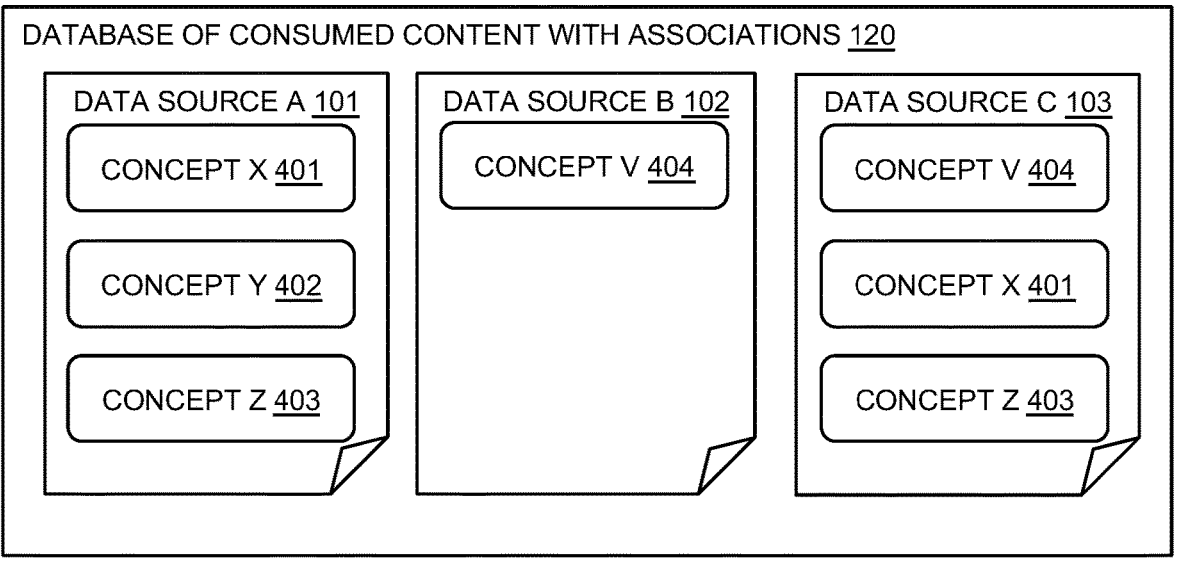
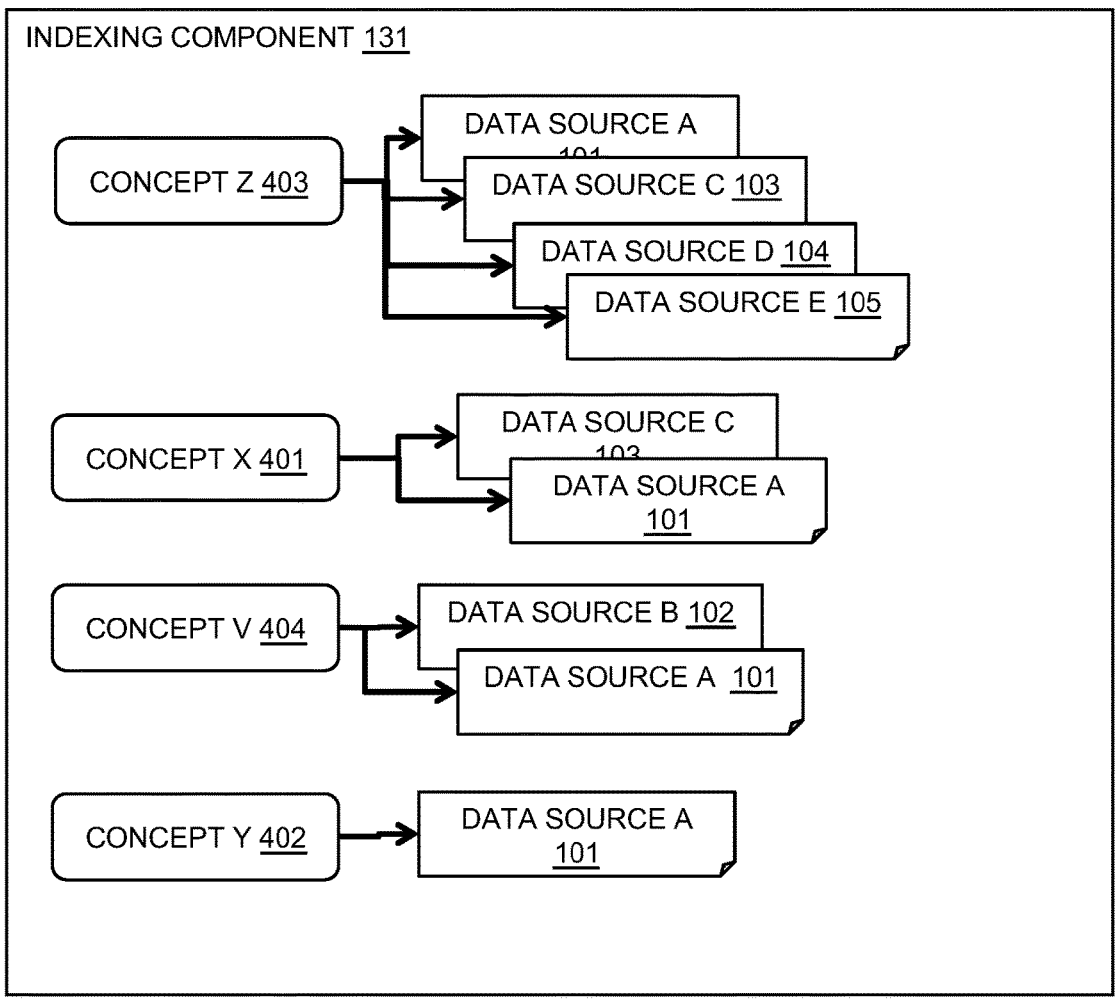

FIG. 4B
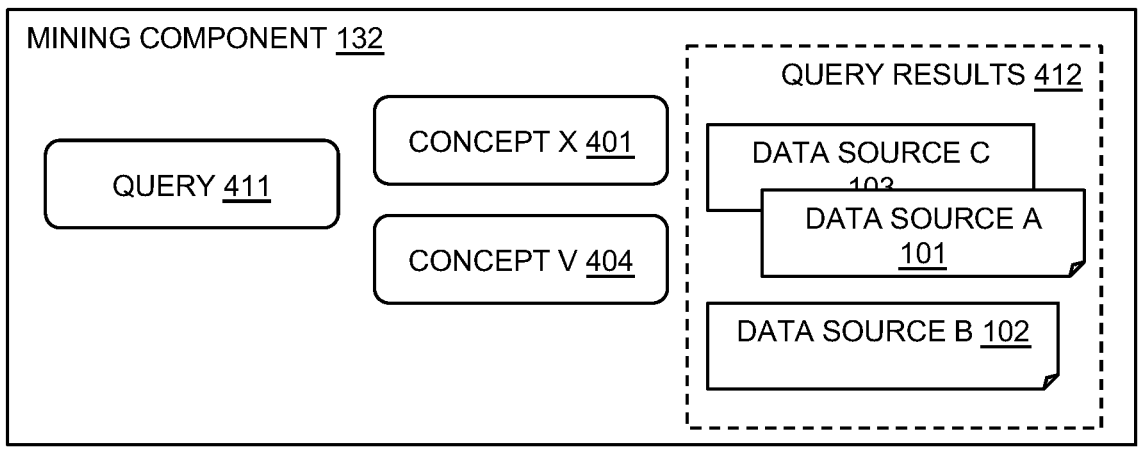
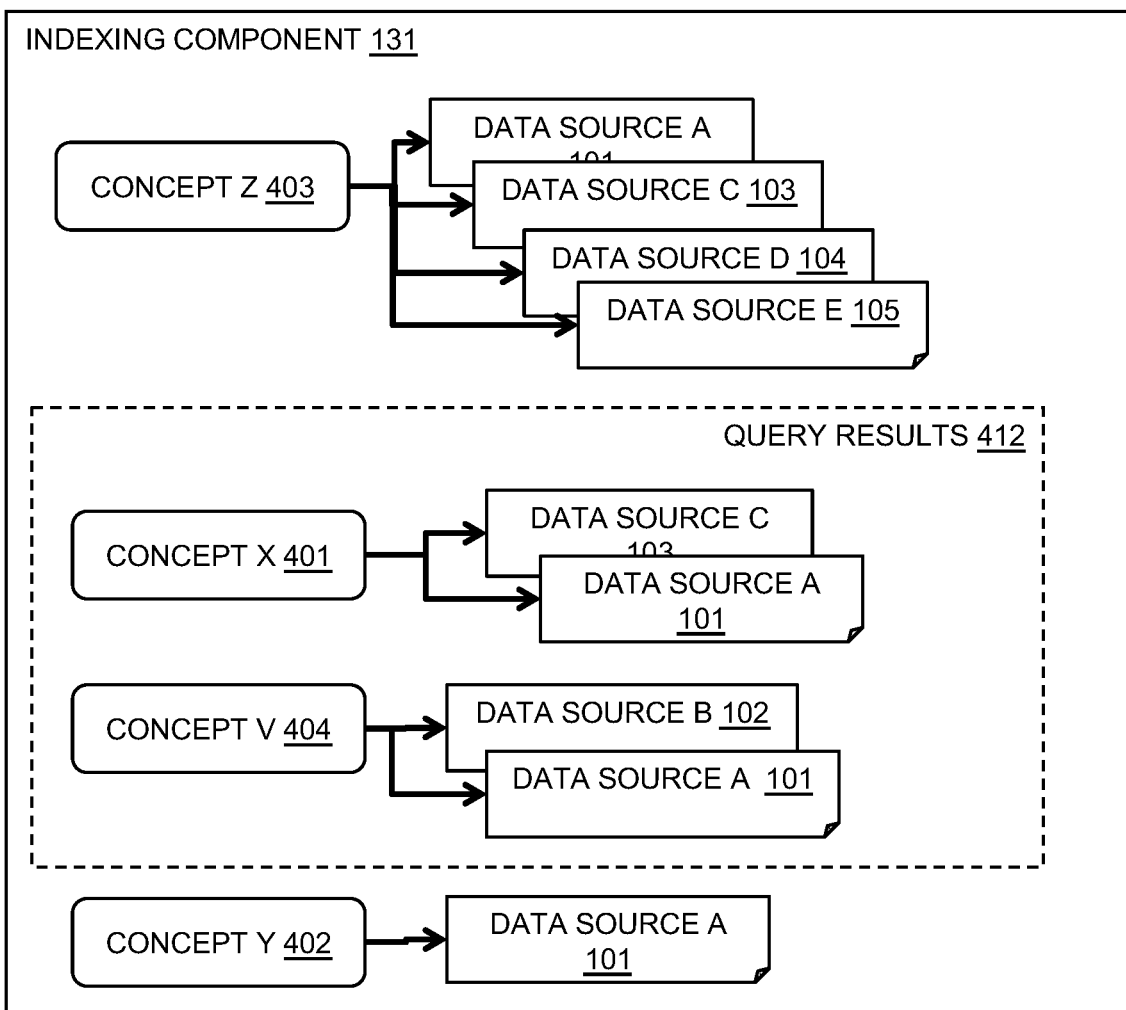

INDEXING AND MINING CONTENT OF MULTIPLE DATA SOURCES

CROSS-REFERENCE TO RELATED APPLICATION

This Application is related to the Application having U.S. application Ser. No. 15/435,816, filed on even date as the present Application.

BACKGROUND

The present invention relates to indexing and mining content of multiple data sources, and more specifically, to indexing using natural language processing.

Managing content and mining content effectively are becoming increasing difficult as the amount of documents and information available increases across different formats.

One example is different content websites that are becoming common methods for delivering and managing content. As examples of content websites, wikis provide collaborative content with no defined owner and blogs provide authored posts.

The ability to organize the data of such content websites such as wikis is a growing concern. It is a common issue where one user may create and manage a page with content but the wider group of users may not be able to find the content. Another common issue is that organizations may have multiple unique wikis that can cause employees or users of the data issues when trying to find the right wiki to search through. Many times, failing to find the right article ends up in duplication of the article with the consequent loss of productivity and the appearance of out of date pages. As the number of unique wikis grows, the ability to organize, track and maintain the wikis are reduced, essentially making them a less powerful tool for an organization.

A wiki is a website that provides collaborative modification of its content and structure directly from the web browser. In a typical wiki, text is written using a simplified markup language (known as "wiki markup"), and often edited with the help of a rich-text editor. A wiki is run using wiki software, otherwise known as a wiki engine. A wiki engine may permit control over different functions (levels of access); for example, editing rights may permit changing, adding or removing material. Others may permit access without enforcing access control. Other rules may also be imposed to organize content. A wiki engine is a type of content management system, but it differs from most other such systems, including blog software, in that the content is created without any defined owner or leader, and wikis have little implicit structure, allowing structure to emerge according to the needs of the users.

A blog (a truncation of the expression weblog) is a discussion or informational website published on the World Wide Web consisting of discrete, often informal diary-style text entries or posts. Posts are typically displayed in reverse chronological order, so that the most recent post appears first, at the top of the web page. Blogs may be the work of a single individual or may be written by large numbers of authors and sometimes professionally edited.

In addition to the problem of managing and mining content of websites such as wikis and blogs, managing and mining content of a diverse group of data sources also provides challenges.

SUMMARY

According to an embodiment of the present invention there is provided a computer-implemented method for indexing and mining content of multiple data sources, comprising: providing a database of learned content of multiple data sources learned using text analysis, the learned content identifying one or more concepts to which a data source relates, wherein the concepts are cognitively associated with the data source and include concepts not explicitly referenced in the data source; providing an index of the learned content including associations between concepts with mappings between concepts and the multiple data sources; receiving input of a query and using text analysis to analyze the query to determine one or more query concepts to which it relates; and mining the indexed concepts in response to the query concepts to return a list of referenced data sources.

According to another aspect of the present invention there is provided a system for indexing and mining content of multiple data sources, comprising: a processor and a memory configured to provide computer program instructions to the processor to execute the function of the components; a database of learned content of multiple data sources learned using text analysis, the learned content identifying one or more concepts to which a data source relates, wherein the concepts are cognitively associated with the data source and include concepts not explicitly referenced in the data source; an indexing component for providing an index of the learned content including associations between concepts with mappings between concepts and the multiple data sources; and a mining component for receiving input of a query and using text analysis to analyze the query to determine one or more query concepts to which it relates and for mining the indexed concepts in response to the query concepts to return a list of referenced data sources.

According to a further aspect of the present invention there is provided a computer program product for indexing and mining content of multiple data sources, the computer program product comprising a computer readable storage medium having program instructions embodied therewith, the program instructions executable by a processor to cause the processor to: provide a database of learned content of multiple data sources learned using text analysis, the learned content identifying one or more concepts to which a data source relates, wherein the concepts are cognitively associated with the data source and include concepts not explicitly referenced in the data source; provide an index of the learned content including associations between concepts with mappings between concepts and the multiple data sources; receive input of a query and using text analysis to analyze the query to determine one or more query concepts to which it relates; and mine the indexed concepts in response to the query concepts to return a list of referenced data sources.

BRIEF DESCRIPTION OF THE DRAWINGS

The subject matter regarded as the invention is particularly pointed out and distinctly claimed in the concluding portion of the specification. The invention, both as to organization and method of operation, together with objects, features, and advantages thereof, may best be understood by reference to the following detailed description when read with the accompanying drawings.

Preferred embodiments of the present invention will now be described, by way of example only, with reference to the following drawings in which:

FIG. 2 is a flow diagram of an example embodiment of a method in accordance with the present invention;

FIGS. 4A and 4B are schematic diagrams illustrating an example embodiment of displayed content and links in accordance with the present invention;

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numbers may be repeated among the figures to indicate corresponding or analogous features.

DETAILED DESCRIPTION

Figure 1:
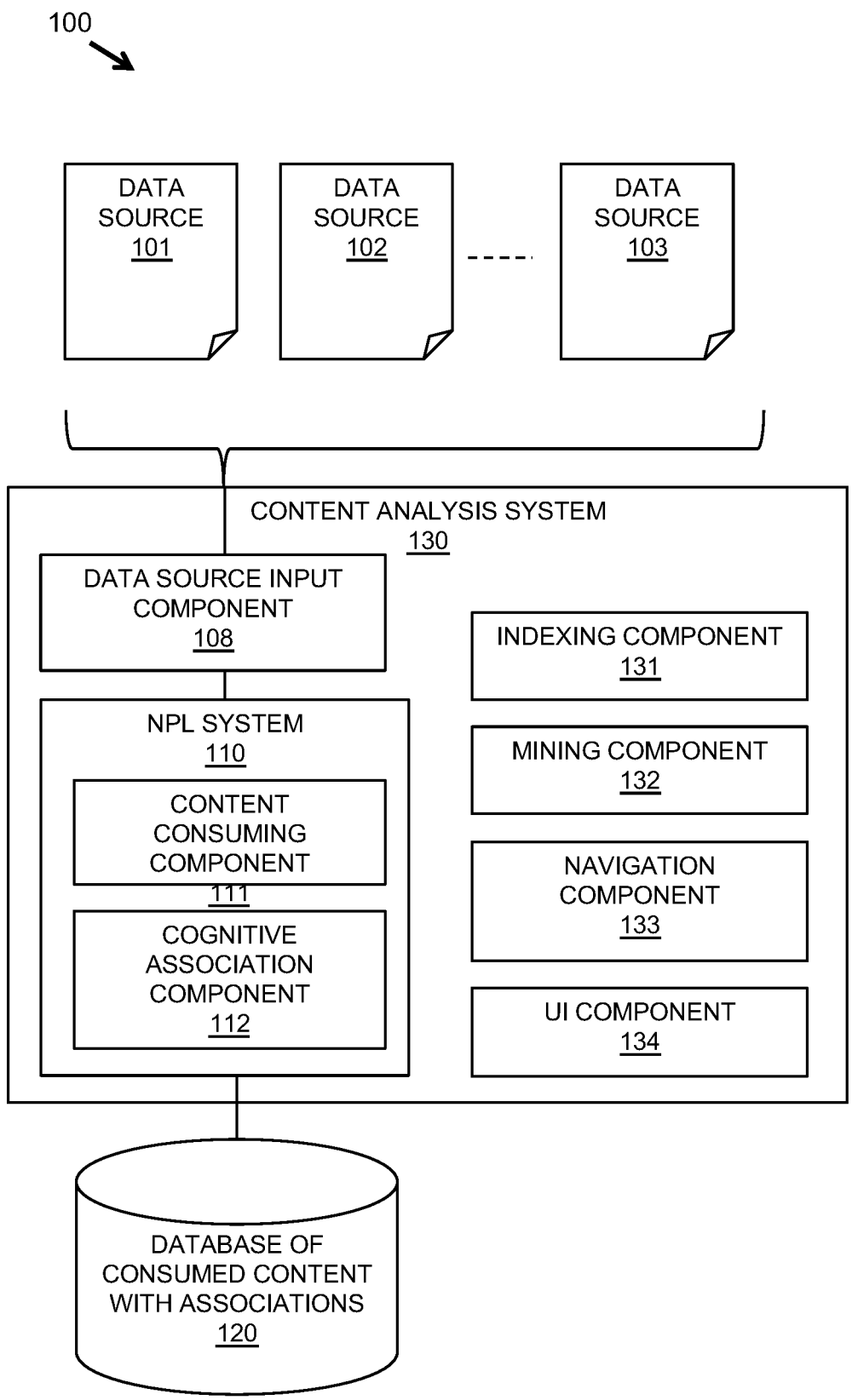
FIG. 1 is a schematic diagram of a system in which the present invention may be implemented.

Methods and systems are provided for indexing and mining content of multiple data sources. Referring to FIG. 1, a block diagram shows an example embodiment of the described system.

Multiple data sources 101-103 may be provided as a corpus or group of data sources defined by a user. The data sources 101-103 may be all of the same type, for example, pages or articles in a wiki, or pages of a blog. Alternatively, the data sources 101-103 may be of different types, such as word documents, wikis, web pages, power points, printable document format, or any document capable of being analyzed by a natural language processing system.

In addition to text based documents, other data sources such as audio, video or image sources may also be used wherein the documents may be pre-analyzed to extract their content for natural language processing, such as converting from audio to text and/or image analysis.

The group of data sources 101-103 are consumed for a content analysis system 130 using natural language processing (NLP) and artificial intelligence (AI) to provide processed content.

In one example, an instance of IBM Watson (IBM and Watson are trademarks of International Business Machines Corporation) NLP is used. The instance of Watson is provided and pointed at the group of data sources. The aspects of Watson that the described method and system makes use of are the technologies behind AlchemyLanguage (AlchemyLanguage is a trademark of International Business Machines Corporation). However, other NLP technologies or services may be used to provide the processed content as described herein.

The data sources 101-103 are analyzed by an NLP system 110 to data mine the relevant information from the content of the data sources 101-103 in order to display the information in a more usable manner and/or provide the information in a more searchable manner. The NLP system 110 may be an instance of an NLP and AI tool such as Watson, which may be provided as a cloud service or as a local service.

The NLP system 110 may consume the multiple data sources 101-103 as selected by using a data source input component 108, including, for example, word docs, wikis, web pages, power points, Internet word docs, knowledge centers, anything that the NLP system 110 knows how to understand. This may extend to non-text based documents, by providing pre-analyzing of the content such as audio to text processing.

The NLP system 110 may include a content consuming component 111 for inputting the data sources 101-103 and running its NLP and AI tools against them, learning the content. As the NLP system 110 learns different sets of data, a cognitive association component 112 may use the artificial intelligence to make cognitive associations or links between data sources 101-103 by determining common concepts or an underlying common topic.

Cognition is the mental process of knowing, including aspects such as awareness, perception, reasoning and judgment. An AI system uses artificial reasoning to interpret the data sources 101-103 and extract their topics or concepts. The learned topics and concepts may not be specifically named or mentioned in the data sources 101-103 and are derived by the AI interpretation.

The learned content of the data sources consumed by the NLP system may be merged into a database 120 or other data storage method of the consumed content with learned concepts of the data sources 101-103 providing association between the content referenced to the original data sources 101-103. The digital content of the original data sources 101-103 remains in the original data sources such as the wiki, web pages, etc., but the database 120 will have a logical understanding of how the original data sources 101-103 fit together using the power of the AI allowing for the concepts and therefore the associations or mappings between the data sources.

The merging of the data into one database 120 allows the content analysis system 130 to act like a search engine, but instead of key word searches, it will use an AI method of making cognitive associations between the data sources using the deduced concepts.

The content analysis system 130 may include a user interface component 134 providing user interaction with the indexed content for mining and navigation.

The content analysis system 130 may include an indexing component 131 for indexing the content. The indexing component 131 may provide an index of topics or concepts of the consumed data sources 101-103 as consumed by the NLP system mapping to the data sources 101-103. The index may list sub-topics and hierarchies for navigation and includes links or references to the original data sources 101-103.

The content analysis system 130 may also include a mining component 132 for mining the data sources 101-103. Once the NLP system 110 has carried out the linking of the data, the mining component 132 may mine the associated concepts from the database 120 of the consumed content to provide the most relevant sets of data sources for a topic being searched.

When a user carries out a topic search or query, instead of returning a simple list of links to the user, the system may return a structured result, similar to a table of contents, based not only on matching keyword like searches, but intelligent searches based on the known associated concepts of the data sets.

The association of concepts may be complex in that a solution, which may be something a user wishes to research and is therefore being mined, may include multiple concepts as determined by the AI learning. For example:

Solution 1 has concepts x,y,z.
Solution 2 has concepts a,b,z.
Solution 3 has concepts z,x,p.

If a search is made for "solution 1", the system may understand that "solution 3" is a highly coupled match even though the search was not made for any individual concept inside "solution 3". As such the returned results would be likely to include information about "solution 3", and in particular references that contain information about the way it relates to "solution 1" by its use of concepts x and z.

The content analysis system 130 may also include a navigation component 133 for learning user navigation around the indexed content by user selection of concepts or topics to improve the navigation for a user.

The navigation component 133 may incorporate analysis of the way a user navigates through the results in order to adjust the relevance of concepts and relationships, in an attempt to focus the results more specifically on the information the user is interested in.

The content analysis system 130 may include the ability to adapt an index, table of contents, or search results for a user. The system may track how the user works through the content and continues to present the information most relevant to the user's usage, regardless of whether the user knew she needed to search for it to begin with. This helps the user to find the right content without requiring the user to be an expert in the topic. This is particularly useful when researching a topic which requires the following of branches of associated topics.

Referring to FIG. 2, a flow diagram 200 shows an example embodiment of an aspect of the described method.

Multiple data sources may be provided 201 by being input into or available to be consumed by a content analysis system. The data sources may be consumed 202 by an NLP system, which may be provided as a service. The data sources' content may be learned and added 203 to a database of the merged learned content of the multiple data sources.

Cognitive associations determined by the AI system may be made 204 in the learned content of the database resulting in a mapping between data sources and their learned concepts. This may also include more complex associations based on combinations of concepts. The learned content may also include a relevancy score of the concept in the data sources.

The output of the learned content of the database with its associations may be provided 205 to a content analysis system for navigation and mining by a user. The content may be provided as an index of the learned content including associations between concepts with mappings between concepts and the multiple data sources. For example, this may be displayed in a topic hierarchy with links to data source documents. Alternatively, this may be viewed as a list of the source documents with their topics and subtopics, providing links between the source documents when there is an overlap of topic. This may also be provided as a searchable database for inputting a search query.

The indexed content may be used to mine 206 content in response to a user query for a topic. The query input may be analyzed 207 using NLP to determine the query concepts. The results may be provided 208 based on the concept associations between the concepts of the query and the learned concepts of the data sources. The results of the query may be provided 209 as a list of concepts with referenced data sources.

The results of the query or the indexed content itself may be displayed 210 as concepts with referenced data sources for user navigation. The user navigation of the indexed content may be analyzed 211 to learn and adapt 212 the displayed content to the user's requirements and interests.

Figure 3A:
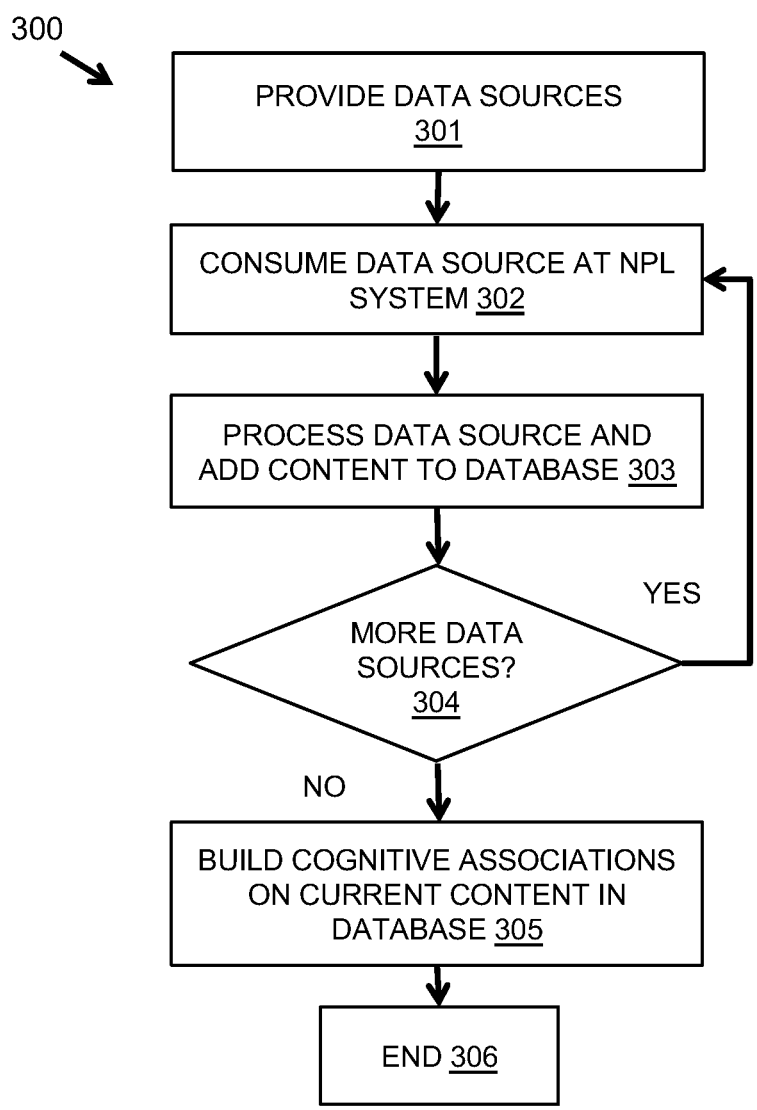
FIGS. 3A and 3B are flow diagrams of an example embodiment of an aspect of a method in accordance with the present invention.

Referring to FIG. 3A, a flow diagram 300 shows an example embodiment of a basic workflow for consuming data. Multiple data sources may be provided 301 and the data sources consumed 302 by the NLP system. The data sources may be processed 303 and their content added to a database of consumed content.

It may be determined 304 if there are more data sources. If so, the method may loop to consume 302 the next data source.

If there are not more data sources to be consumed, the method may build 305 cognitive associations on the current content in the database by relating the learned concepts of the data sources and the method may end 306.

The content in the database may be updated when any of the data sources change including adding new data sources or updating existing data sources.

Figure 3B:
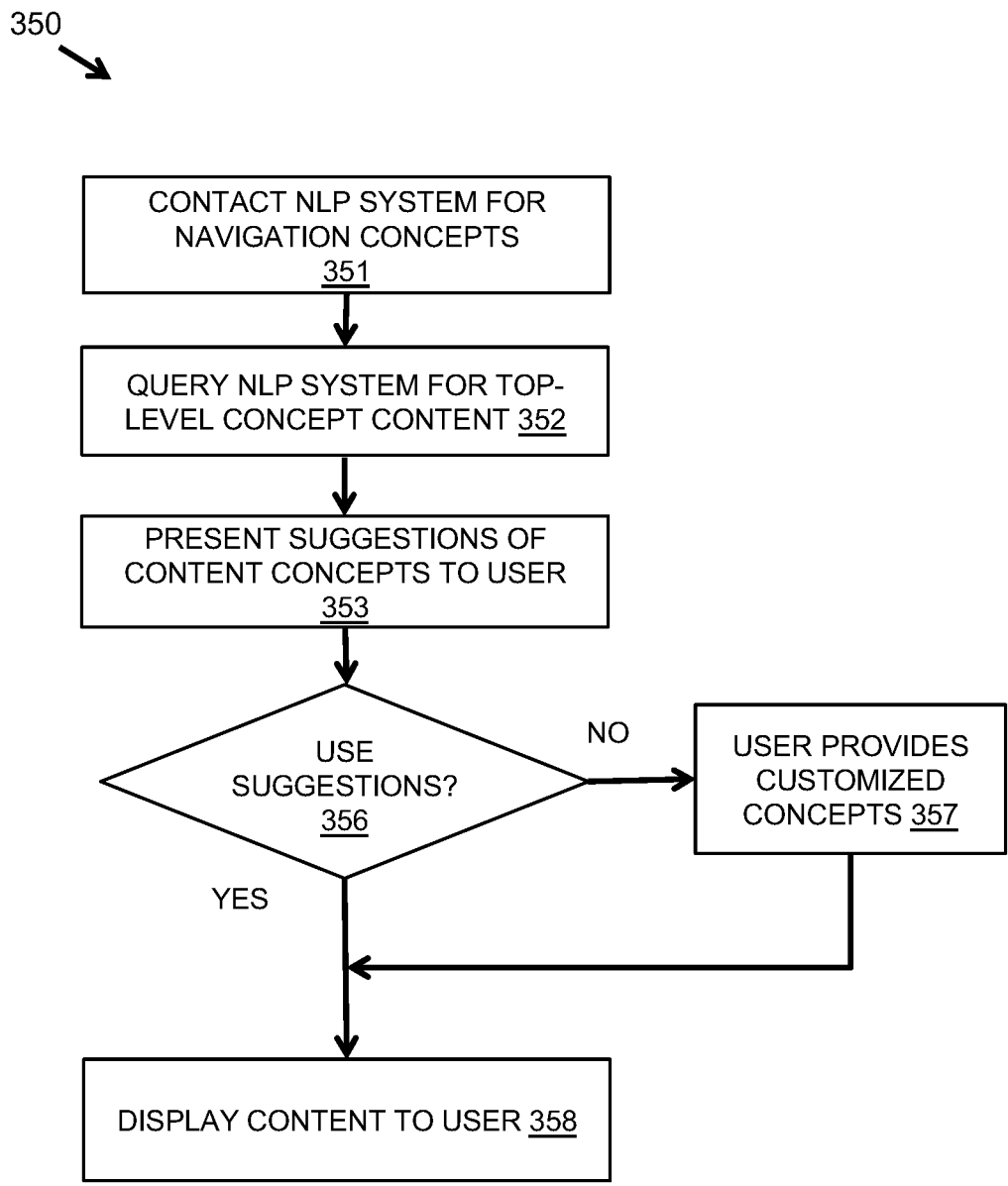

Referring to FIG. 3B, a flow diagram 350 shows an example embodiment of a workflow for showing how top-level concepts or topics for the user's content may be gathered and displayed. This illustrates a flexible approach to user navigation and mining when researching a subject.

As the system learns the content of the data sources, it will interact with the NLP system to determine the most common concepts found in the data sources. The method may track the most common concepts and may determine the top level of navigation from this feedback.

The user may contact 351 the NLP system for navigation concepts that may be based on the learned concepts. The NLP system may be queried for top-level content 352 and the suggestions presented 353 as content concepts to the user.

It may be determined 356 if the user wishes to use the suggested concepts. If so, the content may be displayed to the user 358 in the form of a list of relevant data sources. If not, the user may provide 357 customized concepts and the customized concepts and their relevant data sources may be displayed to the user.

When a user wishes to mine the indexed content, he may input a single keyword to be searched which would search the indexed results from the NLP system to find results that match the concept covered by the keyword.

In a more complicated case, a search may comprise a full sentence and the search itself may be analyzed to determine what concepts are involved in the search and then use this analysis to search against the indexed results from the NLP system.

When a search occurs, the method would search against the results in the form of concepts in order to provide results that are based on the concept analysis rather than traditional keyword searches.

The described method uses the indexing of NLP systems to navigate and mine through multiple data sources. The data sources that are used are input as a specific set and the indexing is used to relate the data sources to each other by common concepts.

The method extends a search to use related concepts between the data sources to provide better results rather than simply comparing each data source individually to the search term(s).

This may be considered as a mapping of topics or concepts and relationships. The relationships between the concepts covered by the data sources would be the basis of the mapping, with the overall relevance of the concepts to the search (again using data from the NLP system) adjusting the order in which specific data sources would appear in the hierarchy.

Referring to FIGS. 4A and 4B, schematic diagrams show the indexing and mining cognitive links provided by the described method and system.

Referring to FIG. 4A, a database of consumed content with associations 120 may be provided with consumed content from multiple data sources 101-105 as consumed by the NLP system. In the diagram only the first three data sources 101-103 are shown. The consumed content may include concepts learned from each data source 101-105 including concepts not directly referenced in the data sources by use of artificial intelligence understanding of the data sources' content.

This results in the database providing a mapping between the concepts and the data sources which results in associations between data sources with common concepts and between concepts due to common data sources, thereby providing a rich source of associations which may be used when mining or navigating the content. This is particularly useful when researching a subject in which associated topics are presented and can be followed.

In this simplified example: data source A 101 may include concepts X 401, Y 402, and Z 403; data source B 102 may include concept V 404; and data source C 103 may include concept V 404, concept X 401, and concept Z 403.

The indexing component 131 may provide an index by concept 401-404 with references to the data sources 101-105 which relate to the concepts 401-404. The indexing component 131 may also or alternatively provide an index by data source 101-105 with references to the concepts 401-404 to which the data sources 101-105 relate.

An example of the first form of index by concept is shown where: concept Z 403 may list references to data source A 101, data source C 103, data source D 104, and data source E 105; concept X 401 may reference data source C 103 and data source A 101; concept V 404 may reference data source B 102 and data source A 101; and concept Y 402 may reference data source A 101.

A user may be provided with the index of concepts and may provide customized concepts. Concepts may also be combined to form complex concepts or topics and further association may be made between data sources based on combinations of concepts.

Referring to FIG. 4B, a mining component 132 may enable a user query 411 to be input. The query 411 may be a single keyword or a string of keywords that may be analyzed by the NLP system to determine one or more concepts 401, 404 to which the query relates.

Referring to the indexing component 131, the search may mine the concepts 401, 404 of the query to return data sources referenced to the concepts.

In this example: concept X 401 has data sources A 101 and C 103 referenced to it; concept V 404 has data source A 101 and data source B 102 referenced to it. Therefore, the query results 412 may return data sources A 101, B 102, and C 103 which may be presented with reference to the concepts X 401, V 404 to which they relate for further navigation and mining by the user.

In addition, the user may mine the index further to see that related concepts include concept Z 403 with additional data sources of interest.

This example is simplified and it will be appreciated that the mapping of combinations of concepts between data sources which may be influenced by the user by selection of concepts to mine, results in a way of mining the learned content to provide relevant data sources to the user.

The NLP system identifies concepts with which the input text is associated, based on other concepts and entities that are present in that text. Concept-related Application Programming Interface (API) functions understand how concepts relate, and can identify concepts that are not directly referenced in the text.

For example, if an article mentions CERN and the Higgs Boson, the Concepts API functions will identify Particle Physics and Large Hadron Collider as concepts even if that term is not mentioned explicitly in the page. Concept tagging enables higher level analysis of input content than just basic keyword identification.

To continue the example from concepts above, say a user searched for CERN, the hierarchy of results might look something like CERN
  a. Data sources covering specific research/achievements by CERN (e.g. Higgs Boson);
  b. Data sources about the CERN organization (where it is based, director, etc.).
  a. Data sources about the LHC at CERN;
  b. Data sources about other particle accelerators;
  c. Data sources about other areas of particle physics that CERN are involved with.

By noticing that articles about CERN all also include the concept of e.g. particle physics, it gives the more thorough search results, including articles relating more generally to these topics that CERN is involved with e.g. particle physics. When a user is searching to find out details about a subject in general this is very useful.

In another example, a user may be working on developing a new "widget". In one embodiment, the user would log into the application and would search for "widget". This would find the most common matches for "widget". However, since the tool learns about the content of the "widget", it knows that a "widget" is made up of "gizmos" and would also highly correlate results relating to "gizmos" in the table of contents that is presented to the user.

In an example of data sources in the form of wiki pages, the described method and system may create indexes and links to ensure that common topics from different areas of the wiki are linked together in a more natural way. Unlike other indexing tools, by utilizing the power of an NLP and AI system, it is possible to ensure that the data is linked by relevant topics and content instead of by keywords and internal links.

In one embodiment, the system may be pointed at a given wiki. It will crawl through the pages much like similar indexing tools and will digest the content of the page. Using NLP technology, the system may learn the content of the wiki, and may generate logical associations between content based on the relevancy of the pages. Using NLP technology, it will use this ability to make intelligent grouping of data sources instead of simple key word and hyper-link associations.

As the system learns the content of the data sources, it will interact with the NLP system to determine the most common topics found in the data sources. The method may track the most common topics and may determine the top level of navigation from this feedback.

If desired, the method may have an option for a manual override for the NLP generated suggestions which may allow administrators to modify the top-level topics, or put in their own topics. User generated topics may feed back to the NLP system and the associated data sources below them will be made. The NLP system may be able to provide hierarchical links with associated content based on the top-level navigation. This will allow for customization of the index as well as allow for the power of the NLP system to determine how to connect the content.

This tool is able to digest and link multiple wikis together to ensure that, if there is relevant information between multiple wikis or documents, the data is linked appropriately. Since there are likely to be multiple data sources or wikis with similar content, this tool will be able to link multiple data sources together and ensure that the data is consumed and associated in a useful manner. Additional data sources such as PDFs, Microsoft Word Documents, Power Points, etc. will be able to combine with the wikis for a more thorough view of the organization's content.

AlchemyLanguage is an example of an NLP and AI service that may be used to provide the text analysis in the described method and system. The text analysis may extract concepts with which the input text is associated. It understands how concepts relate and can also identify concepts that are not directly referenced in the text.

API functions may be provided as part of the text analysis service, each of which uses sophisticated natural language processing techniques to analyze your content and add high-level semantic information.

Keyword Extraction API

Keywords are the important topics in the content and can be used to index data, generate tag clouds or for searching. The keyword extraction algorithm employs sophisticated statistical algorithms and natural language processing technology to analyze the content and identify the relevant keywords.

Concept Tagging

Sophisticated text analysis techniques are employed to concept tag documents in a manner similar to how humans would identify concepts. A concept tagging API is capable of making high-level abstractions by understanding how concepts relate, and can identify concepts that are not necessarily directly referenced in the text. By using concept tagging, higher level analysis of the content than just basic keyword identification may be performed.

An example of concept tagging is provided using a text extract from: http://www.bloomberg.com/news/2013-08-19/investors-start-to-see-post-stimulus-world-approaching.html.

"The more things change . . . Yes, I'm inclined to agree, especially with regards to the historical relationship between stock prices and bond yields. The two have generally traded together, rising during periods of economic growth and falling during periods of contraction. Consider the period from 1998 through 2010, during which the U.S. economy experienced two expansions as well as two recessions: Then central banks came to the rescue. Fed Chairman Ben Bernanke led from Washington with the help of the bank's current $3.6 T balance sheet. He's accompanied by Mario Draghi at the European Central Bank and an equally forthright Shinzo Abe in Japan. Their coordinated monetary expansion has provided all the sugar needed for an equities moonshot, while they vowed to hold global borrowing costs at record lows."

An example output of concepts is shown in Table 1 below with a relevance score calculated for each concept based on statistical analysis, and the results are returned sorted by relevancy.

TABLE 1

| CONCEPT | RELEVANCE |
| --- | --- |
| Monetary policy | 0.972084 |
| Inflation | 0.720149 |
| Central bank | 0.70608 |
| Federal Reserve System | 0.694171 |
| Money supply | 0.648812 |

Generic entities and relations are understood by the concept analysis; however, some organizations need to mine unstructured data for specific information that is unique to their industry or business needs. As a result, organizations may customize the NLP model in order to realize the full value and benefit of mining the unstructured data.

Figure 5:
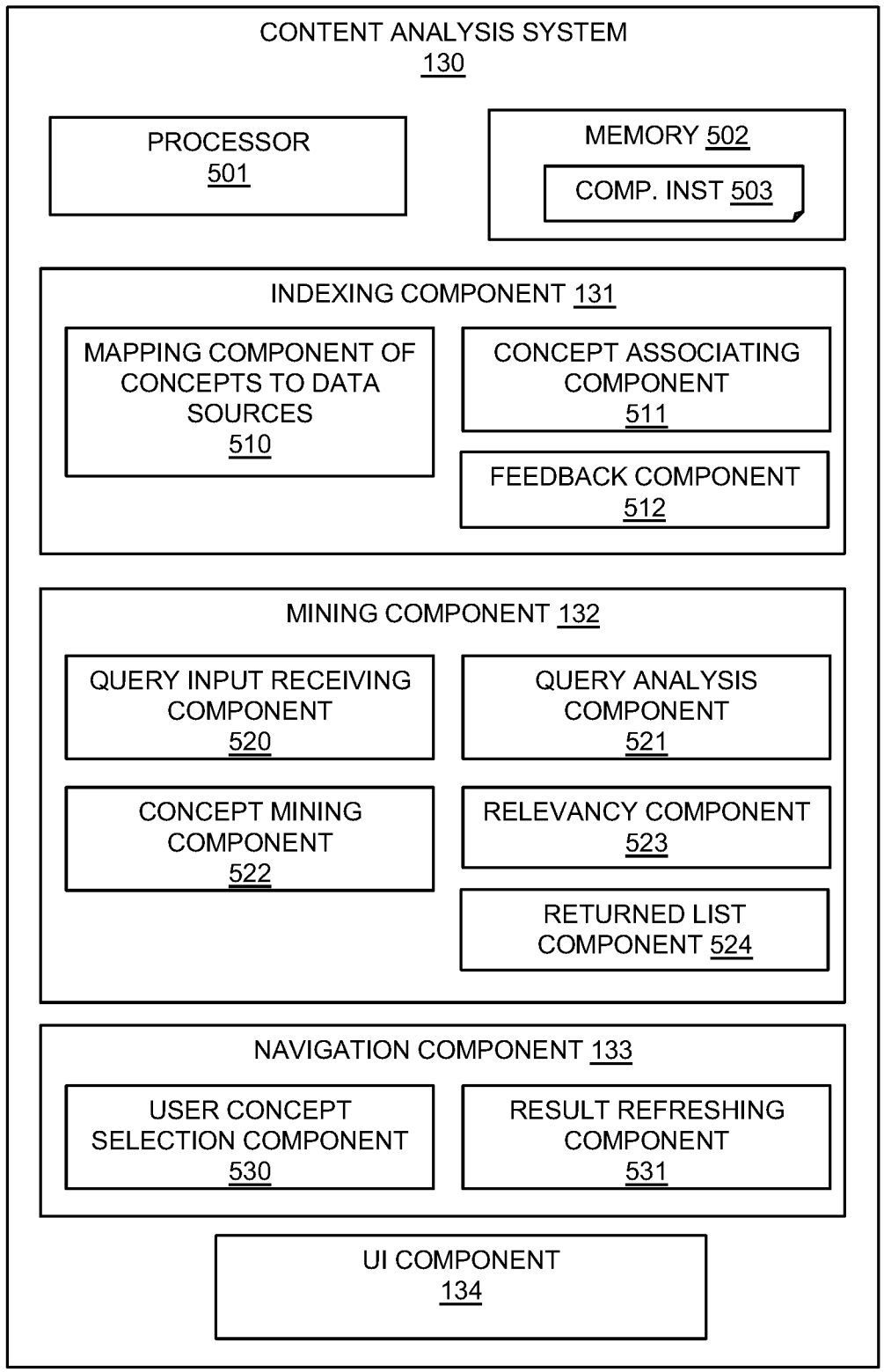
FIG. 5 is block diagram of an example embodiment of a system in accordance with the present invention.

Referring to FIG. 5, a block diagram shows an example embodiment of a content analysis system 130.

The content analysis system 130 may be provided in association with a data source input component 108 for providing multiple data sources for indexing and a natural language processing (NLP) system 110 for consuming the multiple data sources using text analysis to learn content of the data sources and adding the learned content to a database 120. The NLP system 110 may be provided as a service via a network.

The database 120 of consumed content is provided for access by the content analysis system 130. The database 120 may be stored at the NLP system 110 or locally to the content analysis system 130. The database 120 includes the learned content of the multiple data sources learned using text analysis, the learned content identifying one or more concepts to which a data source relates. The concepts are cognitively associated with the data source and include concepts not explicitly referenced in the data source.

The content analysis system 130 may include at least one processor 501, a hardware module, or a circuit for executing the functions of the described components which may be software units executing on the at least one processor. Multiple processors running parallel processing threads may be provided enabling parallel processing of some or all of the functions of the components. Memory 502 may be configured to provide computer instructions 503 to the at least one processor 501 to carry out the functionality of the components.

The content analysis system 130 may include an indexing component 131 for providing an index of the learned content including associations between concepts. The indexing component 131 may include a mapping component of concepts to data sources 510. The indexing component 131 may also include a concept associating component 511 for associating concepts in the index of learned content by association through abstraction of the concepts by text analysis and by association due to cross-referencing in common data sources. The indexing component 131 may also include a feedback component 512 for users for enabling receiving user input for customized concepts in response to providing top level navigation concepts to a user.

The content analysis system 130 may include a mining component 132 including a query input receiving component 520 for receiving input of a query and a query analysis component 521 for using text analysis to analyze the query to determine one or more query concepts to which it relates. The mining component 132 may include a concept mining component 522 for mining the indexed concepts in response to the query concepts and a returned list component 524 for returning a list of referenced data sources. The returned list component 524 may include references to locations of the original data sources. The mining component 132 may include a relevancy component 523 for determining relevancy of data sources to concepts due to statistical analysis of the data sources. The returned list of referenced data sources may be in order of relevancy.

The content analysis system 130 may include a navigation component 133 for user navigation of the returned list of referenced data sources indexed by concept enabling user navigation to one or more associated concepts. The navigation component 133 may include a user concept selection component 530 for user selection of an associated concept and a result refreshing component 531 for refreshing the returned list of referenced data sources based on the user navigation to associated concepts.

Figure 6:
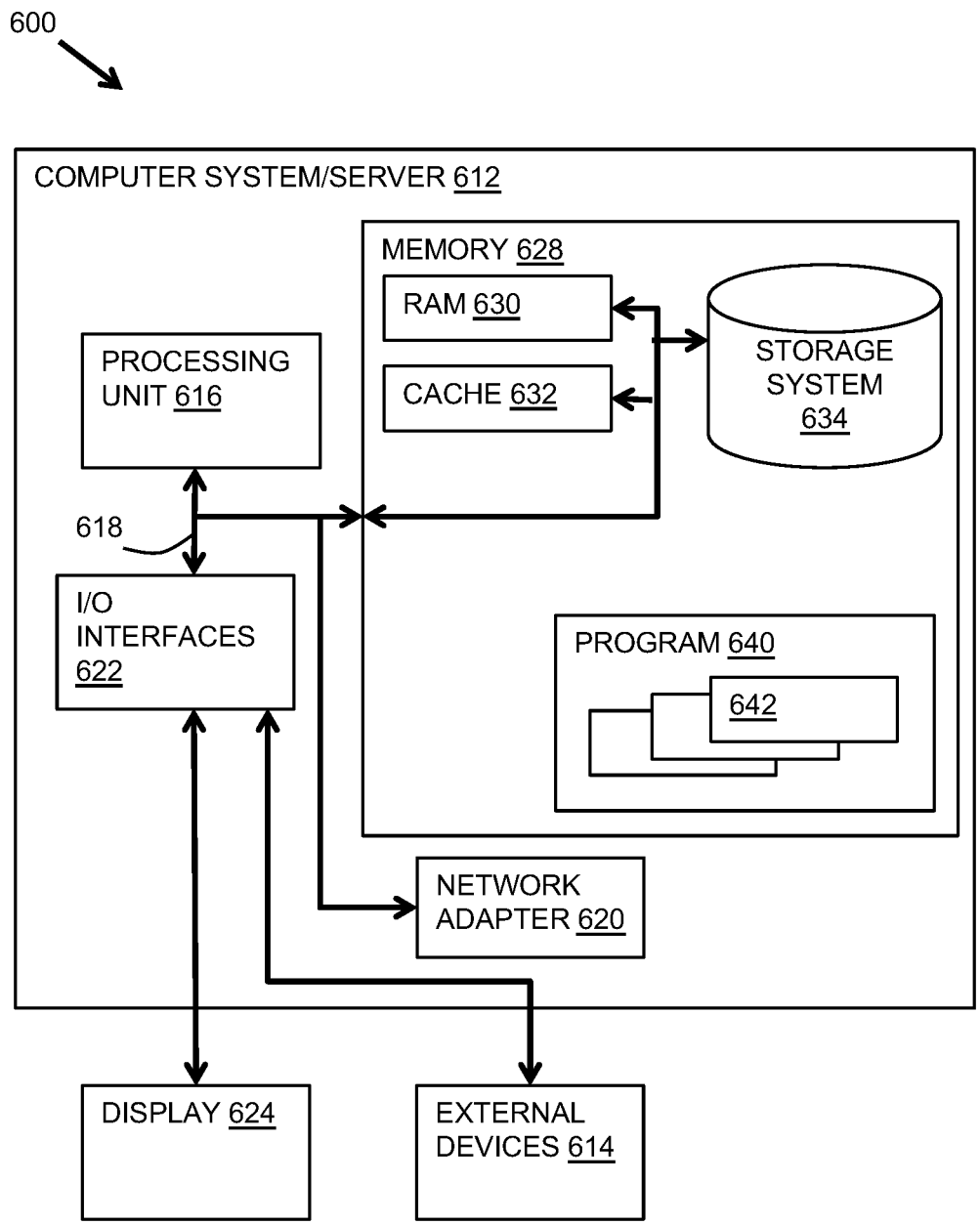
FIG. 6 is a block diagram of an embodiment of a computer system or cloud server in which the present invention may be implemented.

Referring now to FIG. 6, a schematic of an example of a system 600 in the form of a computer system or server is shown.

A computer system or server 612 may be operational with numerous other general purpose or special purpose computing system environments or configurations. Examples of well-known computing systems, environments, and/or configurations that may be suitable for use with computer system/server 612 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 612 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 612 may be practiced in distributed cloud computing environments where tasks are performed by remote processing devices that are linked through a communications network. In a distributed cloud computing environment, program modules may be located in both local and remote computer system storage media including memory storage devices.

In FIG. 6, a computer system/server 612 is shown in the form of a general-purpose computing device. The components of the computer system/server 612 may include, but are not limited to, one or more processors or processing units 616, a system memory 628, and a bus 618 that couples various system components including system memory 628 to processor 616.

Bus 618 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 612 typically includes a variety of computer system readable media. Such media may be any available media that is accessible by computer system/server 612, and it includes both volatile and non-volatile media, removable and non-removable media.

System memory 628 can include computer system readable media in the form of volatile memory, such as random access memory (RAM) 630 and/or cache memory 632. Computer system/server 612 may further include other removable/non-removable, volatile/non-volatile computer system storage media. By way of example only, storage system 634 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 618 by one or more data media interfaces. As will be further depicted and described below, system memory 628 may include at least one program product having a set (e.g., at least one) of program modules that are configured to carry out the functions of embodiments of the invention.

Program/utility 640, having a set (at least one) of program modules 642, may be stored in system memory 628 by way of example, and not limitation, as well as an operating system, one or more application programs, other program modules, and program data. Each of the operating system, one or more application programs, other program modules, and program data or some combination thereof, may include an implementation of a networking environment. Program modules 642 generally carry out the functions and/or methodologies of embodiments of the invention as described herein.

Computer system/server 612 may also communicate with one or more external devices 614 such as a keyboard, a pointing device, a display 624, etc.; one or more devices that enable a user to interact with computer system/server 612; and/or any devices (e.g., network card, modem, etc.) that enable computer system/server 612 to communicate with one or more other computing devices. Such communication can occur via Input/Output (I/O) interfaces 622. Still yet, computer system/server 612 can communicate with one or more networks such as a local area network (LAN), a general wide area network (WAN), and/or a public network (e.g., the Internet) via network adapter 620. As depicted, network adapter 620 communicates with the other components of computer system/server 612 via bus 618. It should be understood that although not shown, other hardware and/or software components could be used in conjunction with computer system/server 612. Examples, include, but are not limited to: microcode, device drivers, redundant processing units, external disk drive arrays, RAID systems, tape drives, and data archival storage systems, etc.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowcharts and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowcharts and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowcharts and/or block diagram block or blocks.

The flowcharts and block diagrams in the Figures illustrate the architecture, functionality, and operation of possible implementations of systems, methods, and computer program products according to various embodiments of the present invention. In this regard, each block in the flowcharts or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

Cloud Computing

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 7:
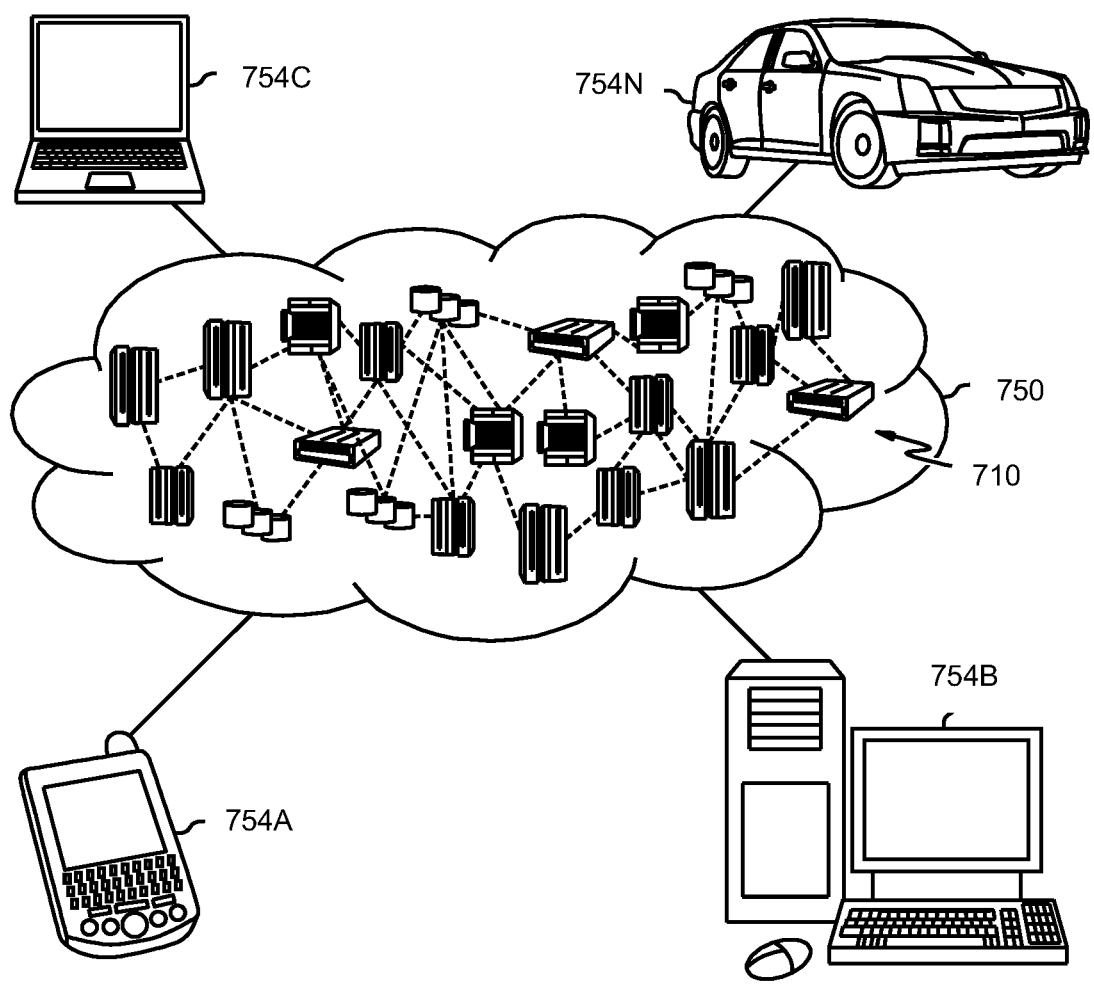
FIG. 7 is a schematic diagram of a cloud computing environment in which the present invention may be implemented.

Referring now to FIG. 7, illustrative cloud computing environment 750 is depicted. As shown, cloud computing environment 750 includes one or more cloud computing nodes 710 with which local computing devices used by cloud consumers, such as, for example, personal digital assistant (PDA) or cellular telephone 754A, desktop computer 754B, laptop computer 754C, and/or automobile computer system 754N may communicate. Nodes 710 may communicate with one another. They may be grouped (not shown) physically or virtually, in one or more networks, such as Private, Community, Public, or Hybrid clouds as described hereinabove, or a combination thereof. This allows cloud computing environment 750 to offer infrastructure, platforms and/or software as services for which a cloud consumer does not need to maintain resources on a local computing device. It is understood that the types of computing devices 754A-N shown in FIG. 7 are intended to be illustrative only and that computing nodes 710 and cloud computing environment 750 can communicate with any type of computerized device over any type of network and/or network addressable connection (e.g., using a web browser).

Figure 8:
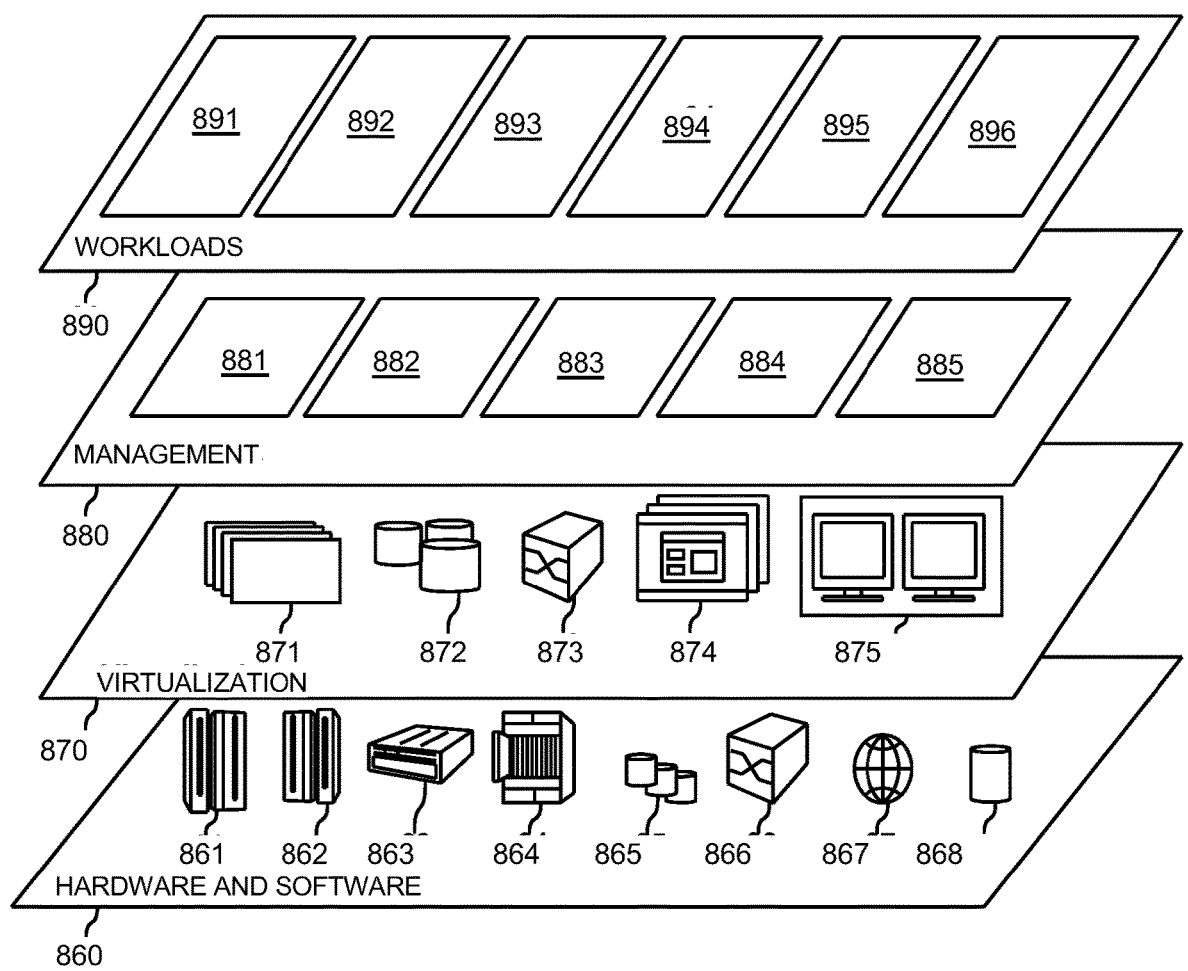
FIG. 8 is a diagram of abstraction model layers of a cloud computing environment in which the present invention may be implemented.

Referring now to FIG. 8, a set of functional abstraction layers provided by cloud computing environment 750 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 860 includes hardware and software components. Examples of hardware components include: mainframes 861; RISC (Reduced Instruction Set Computer) architecture based servers 862; servers 863; blade servers 864; storage devices 865; and networks and networking components 866. In some embodiments, software components include network application server software 867 and database software 868.

Virtualization layer 870 provides an abstraction layer from which the following examples of virtual entities may be provided: virtual servers 871; virtual storage 872; virtual networks 873, including virtual private networks; virtual applications and operating systems 874; and virtual clients 875.

In one example, management layer 880 may provide the functions described below. Resource provisioning 881 provides dynamic procurement of computing resources and other resources that are utilized to perform tasks within the cloud computing environment. Metering and Pricing 882 provides cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 883 provides access to the cloud computing environment for consumers and system administrators. Service level management 884 provides cloud computing resource allocation and management such that required service levels are met. Service Level Agreement (SLA) planning and fulfillment 885 provides pre-arrangement for, and procurement of, cloud computing resources for which a future requirement is anticipated in accordance with an SLA.

Workloads layer 890 provides examples of functionality for which the cloud computing environment may be utilized. Examples of workloads and functions which may be provided from this layer include: mapping and navigation 891; software development and lifecycle management 892; virtual classroom education delivery 893; data analytics processing 894; transaction processing 895; and NLP processing with indexing and mining of content 896.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Improvements and modifications can be made to the foregoing without departing from the scope of the present invention.

What is claimed is:

1. A computer-implemented method for indexing and mining content of multiple data sources, comprising:
   providing a database of learned content of multiple data sources learned using text analysis, the learned content identifying one or more concepts to which a data source relates, wherein the concepts are cognitively associated with the data source and include concepts not explicitly referenced in the data source such that, at least some of the concepts are inferred notwithstanding whether those inferred concepts are explicitly mentioned in the data source;
   providing an index of the learned content including associations between concepts with mappings between concepts and the multiple data sources;
   receiving input of a query from a user on an interface and using the text analysis to analyze the query to determine one or more query concepts to which the query relates, wherein using the text analysis to analyze the query to determine the one or more query concepts includes analyzing words of a sentence of the query input by the user, in aggregate, to determine one or more concepts covered by the sentence prior to searching for the query concepts in the database notwithstanding whether the query concepts are identical to the words used in the sentence;
   responsive to determining the query concepts, mining the indexed concepts in response to the query concepts to return a list of referenced data sources on the interface, wherein returning the list of referenced data sources includes returning the list of referenced data sources in order of a relevancy score of each of the referenced data sources, and wherein the referenced data sources are returned on the list, according to the relevancy score, notwithstanding whether the query included a search for any individual concept inside the referenced data sources;
   presenting the returned list of referenced data sources indexed by concept on the interface to the user, wherein returning the list of reference data sources indexed by concept includes presenting additional data sources of suggested concepts of which are tightly related to the one or more query concepts yet were not included in the query by the user, wherein the suggested concepts are identified by first identifying the one or more query concepts by searching the indexed concepts using keywords included in the query, and using the one or more query concepts as input to an additional search to the indexed concepts by performing a concept search that does not use keywords as input, and wherein as the user navigates through respective concepts returned by the query on the interface in a hierarchal manner, the returned list of referenced data sources presented on the interface is continually refreshed in real-time according to updated relevancy scores of each of the referenced data sources as necessitated by the navigation of the user through the respective concepts; and
   providing, via the index of the learned content, top level navigation concepts to the user enabling receiving user input for customized concepts; wherein the top level navigation concepts are determined by tracking the most common concepts of the multiple data sources as identified during ingestion of the learned content using the text analysis prior to receiving the user input such that the top level navigation concepts comprise the most common concepts.

2. The method as claimed in claim 1, including associating concepts in the index of learned content by association through abstraction of the concepts by text analysis.

3. The method as claimed in claim 1, including associating concepts in the index of learned content by association due to cross-referencing in common data sources.

4. The method as claimed in claim 1, mining the indexed concepts includes determining the relevancy score of data sources to concepts due to statistical analysis of the data sources.

5. The method as claimed in claim 1, wherein using text analysis to analyze the query to determine one or more query concepts includes analyzing one or more keywords of a query to determine one or more concepts covered by the keywords.

6. The method as claimed in claim 1, wherein the multiple data sources are a set of data sources selected for indexing and mining.

7. The method as claimed in claim 1, wherein the method is provided as a service in a cloud environment.

8. A system for indexing and mining content of multiple data sources, comprising:
   a processor and a memory configured to provide computer program instructions to the processor to execute the function of the components;
   a database of learned content of multiple data sources learned using text analysis, the learned content identifying one or more concepts to which a data source relates, wherein the concepts are cognitively associated with the data source and include concepts not explicitly referenced in the data source such that, at least some of the concepts are inferred notwithstanding whether those inferred concepts are explicitly mentioned in the data source;
   an indexing component for providing an index of the learned content including associations between concepts with mappings between concepts and the multiple data sources;
   a mining component for receiving input of a query from a user on an interface and using the text analysis to analyze the query to determine one or more query concepts to which the query relates, wherein using the text analysis to analyze the query to determine the one or more query concepts includes analyzing words of a sentence of the query input by the user, in aggregate, to determine one or more concepts covered by the sentence prior to searching for the query concepts in the database notwithstanding whether the query concepts are identical to the words used in the sentence; and, responsive to determining the query concepts, for mining the indexed concepts in response to the query concepts to return a list of referenced data sources on the interface, wherein returning the list of referenced data sources includes returning the list of referenced data sources in order of a relevancy score of each of the referenced data sources, and wherein the referenced data sources are returned on the list, according to the relevancy score, notwithstanding whether the query included a search for any individual concept inside the referenced data sources;

an interface component for presenting the returned list of referenced data sources indexed by concept on the interface to the user, wherein returning the list of reference data sources indexed by concept includes presenting additional data sources of suggested concepts of which are tightly related to the one or more query concepts yet were not included in the query by the user, wherein the suggested concepts are identified by first identifying the one or more query concepts by searching the indexed concepts using keywords included in the query, and using the one or more query concepts as input to an additional search to the indexed concepts by performing a concept search that does not use keywords as input, and wherein as the user navigates through respective concepts returned by the query on the interface in a hierarchal manner, the returned list of referenced data sources presented on the interface is continually refreshed in real-time according to updated relevancy scores of each of the referenced data sources as necessitated by the navigation of the user through the respective concepts; and a feedback component for enabling receiving user input for customized concepts in response to providing top level navigation concepts to the user; wherein the top level navigation concepts are determined by tracking the most common concepts of the multiple data sources as identified during ingestion of the learned content using the text analysis prior to receiving the user input such that the top level navigation concepts comprise the most common concepts.

9. The system as claimed in claim 8, including:
a data source input component for providing multiple data sources for indexing; and
a natural language processing (NLP) system for consuming the multiple data sources using text analysis to learn content of the data sources and adding the learned content to the database.

10. The system as claimed in claim 8, wherein the indexing component includes a concept associating component for associating concepts in the index of learned content by association through abstraction of the concepts by text analysis and by association due to cross-referencing in common data sources.

11. The system as claimed in claim 8, wherein the mining component includes a relevancy component for determining the relevancy score of data sources to concepts due to statistical analysis of the data sources.

12. The system as claimed in claim 8, wherein the returned list of referenced data sources includes references to locations of the original data sources.

13. A computer program product for indexing and mining content of multiple data sources, the computer program product comprising a non-transitory computer readable storage medium having program instructions embodied therewith, the program instructions executable by a processor to cause the processor to:

provide a database of learned content of multiple data sources learned using text analysis, the learned content identifying one or more concepts to which a data source relates, wherein the concepts are cognitively associated with the data source and include concepts not explicitly referenced in the data source such that, at least some of the concepts are inferred notwithstanding whether those inferred concepts are explicitly mentioned in the data source;

provide an index of the learned content including associations between concepts with mappings between concepts and the multiple data sources;

receive input of a query from a user on an interface and using the text analysis to analyze the query to determine one or more query concepts to which the query relates, wherein using the text analysis to analyze the query to determine the one or more query concepts includes analyzing words of a sentence of the query input by the user, in aggregate, to determine one or more concepts covered by the sentence prior to searching for the query concepts in the database notwithstanding whether the query concepts are identical to the words used in the sentence;

responsive to determining the query concepts, mine the indexed concepts in response to the query concepts to return a list of referenced data sources, wherein returning the list of referenced data sources includes returning the list of referenced data sources in order of a relevancy score of each of the referenced data sources on the interface, and wherein the referenced data sources are returned on the list, according to the relevancy score, notwithstanding whether the query included a search for any individual concept inside the referenced data sources;

present the returned list of referenced data sources indexed by concept on the interface to the user, wherein returning the list of reference data sources indexed by concept includes presenting additional data sources of suggested concepts of which are tightly related to the one or more query concepts yet were not included in the query by the user, wherein the suggested concepts are identified by first identifying the one or more query concepts by searching the indexed concepts using keywords included in the query, and using the one or more query concepts as input to an additional search to the indexed concepts by performing a concept search that does not use keywords as input, and wherein as the user navigates through respective concepts returned by the query on the interface in a hierarchal manner, the returned list of referenced data sources presented on the interface is continually refreshed in real-time according to updated relevancy scores of each of the referenced data sources as necessitated by the navigation of the user through the respective concepts; and provide, via the index of the learned content, top level navigation concepts to the user enabling receiving user input for customized concepts; wherein the top level navigation concepts are determined by tracking the most common concepts of the multiple data sources as identified during ingestion of the learned content using the text analysis prior to receiving the user input such that the top level navigation concepts comprise the most common concepts.

\* \* \* \* \*